United States Patent [19]
Hattori

[11] Patent Number: 5,122,957
[45] Date of Patent: Jun. 16, 1992

[54] AUTONOMOUS VEHICLE FOR AUTOMATICALLY/AUTONOMOUSLY RUNNING ON ROUTE OF TRAVEL AND ITS METHOD USING FUZZY CONTROL

[75] Inventor: Akira Hattori, Kanagawa, Japan

[73] Assignee: Nissan Motor Company, Limited, Yokohama, Japan

[21] Appl. No.: 485,910

[22] Filed: Feb. 27, 1990

[30] Foreign Application Priority Data

Feb. 28, 1989 [JP] Japan .................... 1-45270

[51] Int. Cl.$^5$ .................... G06F 15/50; G06K 9/00
[52] U.S. Cl. .................... 364/424.02; 364/516; 382/1
[58] Field of Search .................... 364/424.02, 424.01, 364/516; 382/10, 22, 25, 1

[56] References Cited

U.S. PATENT DOCUMENTS

| | | | |
|---|---|---|---|
| 4,760,896 | 8/1988 | Yamaguchi | 364/513 X |
| 4,847,772 | 7/1989 | Michaelopoulous et al. | 382/10 X |
| 4,926,346 | 5/1990 | Yokoyama | 364/424.02 X |
| 4,931,937 | 6/1990 | Kakinami et al. | 382/22 X |
| 4,954,962 | 9/1990 | Evans, Jr. et al. | 364/424.02 X |
| 4,958,288 | 9/1990 | Takahashi | 364/424.04 |
| 4,970,653 | 11/1990 | Kanue | 364/424.02 X |

OTHER PUBLICATIONS

Zadeh, "Making Computers Think Like People", IEEE Spectrum, Aug. 1984.

*Primary Examiner*—Parshotam S. Lall
*Assistant Examiner*—Thomas S. Aucherlonie
*Attorney, Agent, or Firm*—Pennie & Edmonds

[57] ABSTRACT

An autonomously running vehicle and method for autonomously running the vehicle on a route of travel are disclosed in which using a plurality of control rules defining predetermined steering controlled variables according to magnitude classifications of previously classified deviations on steering operations and membership functions indicating certainties corresponding to respective classifications of actual deviations (offset), the certainties corresponding to each magnitude classification are correlated to the control rules to determine the steering controlled variable. In the autonomously running vehicle, the vehicle's running scenes are automatically detected on the basis of the image data derived by an image processing unit. Reference membership functions are varied (constricted or reduced) according to any one of the running scenes so that the membership functions are automatically set according to the running scenes. Control rules are previously set only to the reference membership functions. Hence, setting operations of control rules and membership functions through simulations may be carried out only for the reference membership functions.

22 Claims, 10 Drawing Sheets

CLASSIFICATION
MEMBERSHIP FUNCTION OF POSITIONAL DEVIATION QUANTITY Δx

FIG. 7

CLASSIFICATION
MEMBERSHIP FUNCTION OF STEERING ANGLE DEVIATION QUANTITY Δθ

FIG. 8

| A(x,θ) | | CLASSIFICATION OF Δx | | | | |
|---|---|---|---|---|---|---|
| | | -B | -M | S | M | B |
| | -B | 10 | 6 | 4 | 2 | 0 |
| | -M | 6 | 3 | 1 | 0 | -1 |
| | S | 3 | 1 | 0 | -1 | -3 |
| | M | 1 | 0 | -1 | -3 | -6 |
| | B | 0 | -2 | -4 | -6 | -10 |

CLASSIFICATION OF Δθ

AUTONOMOUS VEHICLE FOR AUTOMATICALLY/AUTONOMOUSLY RUNNING ON ROUTE OF TRAVEL AND ITS METHOD USING FUZZY CONTROL

BACKGROUND OF THE INVENTION (1) Field of the Invention

The present invention relates generally to an autonomous vehicle which runs autonomously on a route of travel toward a destination and its method using a fuzzy control.

(2) Background of the Art

A Japanese Patent Application First Publication (JP-Al) Showa 62-162113 published in Jul. 18, 1987 and Japanese Utility Model Registration Application First Publication (JP-Al) Heisei 1-15510 published on Oct. 25, 1989 exemplify a previously proposed autonomous vehicle autonomously running on a set route of travel.

A U.S. patent application Ser. No. 337,707 filed on Apr. 13, 1989 also exemplifies the previously proposed autonomous vehicle described above.

It is noted that, in the above-identified Japanese Utility Model Application First Publication No. Heisei 1-15510, a camera which photographs a running route of the vehicle is installed on the autonomous vehicle to run autonomously the vehicle along a guide line, e.g., a white line on the running route of travel.

In addition, in order to smoothly operate the vehicle, the autonomous running vehicle has been proposed in which a concept of fuzzy set is introduced to its steering operation.

The concept of the fuzzy control set in the autonomously running vehicle is such that, using a plurality of control rules defining predetermined controlled variables of the steering operation according to classifications on magnitudes in deviations with respect to a neutral steering position previously divided into such as "large", "intermediate", and "small" and membership functions indicating certainties corresponding to the respective classifications for the actual deviations in terms of fuzzy sets, the steering controlled variable is determined from a total sum of each control rule by correlating the certainties corresponding to respective magnitude classifications for the actual deviations derived by the functions with the control rules.

Hence, according to the aotonomous running vehicle to which the fuzzy control is applied, the vehicle runs autonomously toward a target point which has previously been set on the basis of a map data, a deviation quantity (dispersion) between a predicted value of the steering controlled variable toward, e.g., a constant distance $L_m$ and the automatically set target value is calculated according to a road situation imaged by means of the camera, and an appropriate steering control is carried out by applying the calculated deviation to the above-described control rules.

In more details, the control rules prescribe for each of the plural classifications that a large controlled variable is given to a large deviation, a small controlled variable is given to a small deviation. A degree of importance is increased for the corresponding control rules according to the actual deviation quantity and a weight average is taken for all control rules so that a smooth steering control is carried out.

The control rules and membership functions are set by repeating running simulations for respective running scenes such as straight road run, curved road run, obstacle avoiding run, and turning at intersections.

However, setting operations for the control rules and membership functions are such that the repeated simulations are carried out in a trial and error to approximate the control rules and membership functions. Therefore, a large amount of time is required for the setting operations.

For example, the above-described deviation quantity is represented by the deviation quantity X from both side end portions of the running road and $\theta$ with respect to the neutral steering angle. In addition, the classifications of magnitudes are divided into three stages: "large", "intermediate", and "small".

Since both of insufficient ($-$) and extra ($+$) for "large" and "intermediate" are present, the classifications are divided into five stages. As a total, 25 kinds of control rules will be resulted with both combinations. In addition, since both membership functions of both X and $\theta$ are respectively defined, these setting operations are extremely troublesome.

SUMMARY OF THE INVENTION

It is an object of the present invention to provide an autonomous vehicle automatically running on a running route and its method which can easily set membership functions indicating certainties corresponding to each classification of the actual deviation.

The above described object can be achieved by providing an autonomous vehicle, comprising: a) first means for imaging a road surface on which the vehicle runs, having an image plane and an associated image data generating means; b) second means for detecting a plurality of predetermined features contained within the data output by the first means and generating characterizing point data corresponding to said plurality of predetermined features; c) third means for classifying the image data output by said first means as a running scene among a group of predetermined running scenes on the basis of the characterizing point data generated by the second means; d) fourth means for selecting at least one among a group of predetermined reference membership functions according to the classification of the running scene, said membership function indicating a certainty of correspondence between a measured steering deviation quantity and a member of a group of predetermined deviation magnitudes, said measured steering deviation quantity being a difference between a measured vehicle steering angle and a predetermined vehicle steering angle; e) fifth means for measuring a steering angle of the vehicle; f) sixth means for selecting, based on a reference membership function selected by said fourth means and a measured steering deviation quantity operated on by said selected function, at least one among a group of predetermined control rules; g) seventh means for calculating a steering controlled variable of the vehicle on the basis of the measured steering angle of the vehicle, characterizing point data generated by the second means, the membership function selected by the fourth means, and a control rule selected by the sixth means; and h) eighth means for controlling an operation of a mechanism controlling the steering angle of the vehicle according to the calculated steering controlled variable.

The above described object can also be achieved by providing a method for autonomously operating a vehicle, comprising the steps of: a) imaging a road surface on which the vehicle runs, and generating an associated image data; b) detecting a plurality of predetermined features contained within the image data output by step a) and generating characterizing point data corresponding to said plurality of predetermined features; c) classifying the image data output by said step a) as a running scene among a group of predetermined running scenes on the basis of the characterizing point data generated by step b); d) selecting at least one among a group of predetermined reference membership functions according to the classification of the running scene, said membership function indicating a certainty of correspondence between a measured steering deviation quantity and a member of a group of predetermined deviation magnitudes, said measured steering deviation quantity being a difference between a measured vehicle steering angle and a predetermined vehicle steering angle; e) measuring a steering angle of the vehicle; f) selecting, based on a reference membership function selected by step d) and a measured steering deviation quantity operated on by said selected reference membership function, at least one among a group of predetermined control rules; g) calculating a steering controlled variable of the vehicle on the basis of the measured steering angle of the vehicle, characterizing point data generated by step b), the membership function selected by step d), and a control rule selected by step f); and h) controlling an operation of a mechanism controlling the steering angle of the vehicle according to the calculated steering controlled variable.

DETAILED DESCRIPTION OF THE PREFERRED EMBODIMENTS

Reference will hereinafter be made to the drawings in order to facilitate a better understanding of the present invention.

Figure 1:
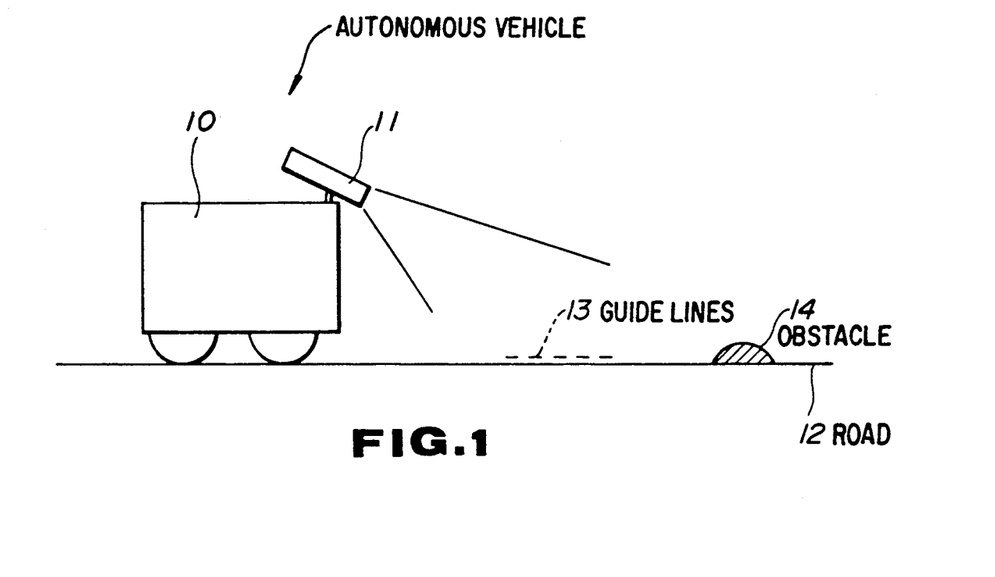
FIG. 1 is a schematic side view of an autonomous vehicle model used in a preferred embodiment according to the present invention.
Figure 2:
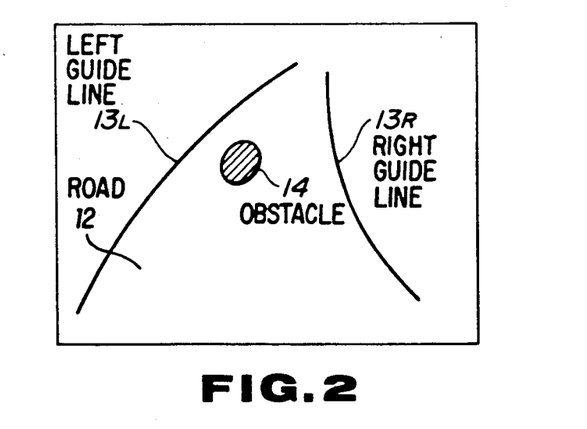
FIG. 2 is a schematic explanatory view of a running road on which the autonomous vehicle shown in FIG. 1 runs.

FIG. 1 shows an autonomous vehicle in a preferred embodiment according to the present invention.

In the preferred embodiment, a camera 11 is installed on a vehicle main body 10 as shown in FIG. 1.

The autonomous vehicle runs autonomously, continuously photographing the path of travel, including guide lines (white lines) 13. (subscript R denotes right and subscript L denotes left) and any obstacle 14 at a predetermined control period, as shown in FIG. 1.

Figure 3:
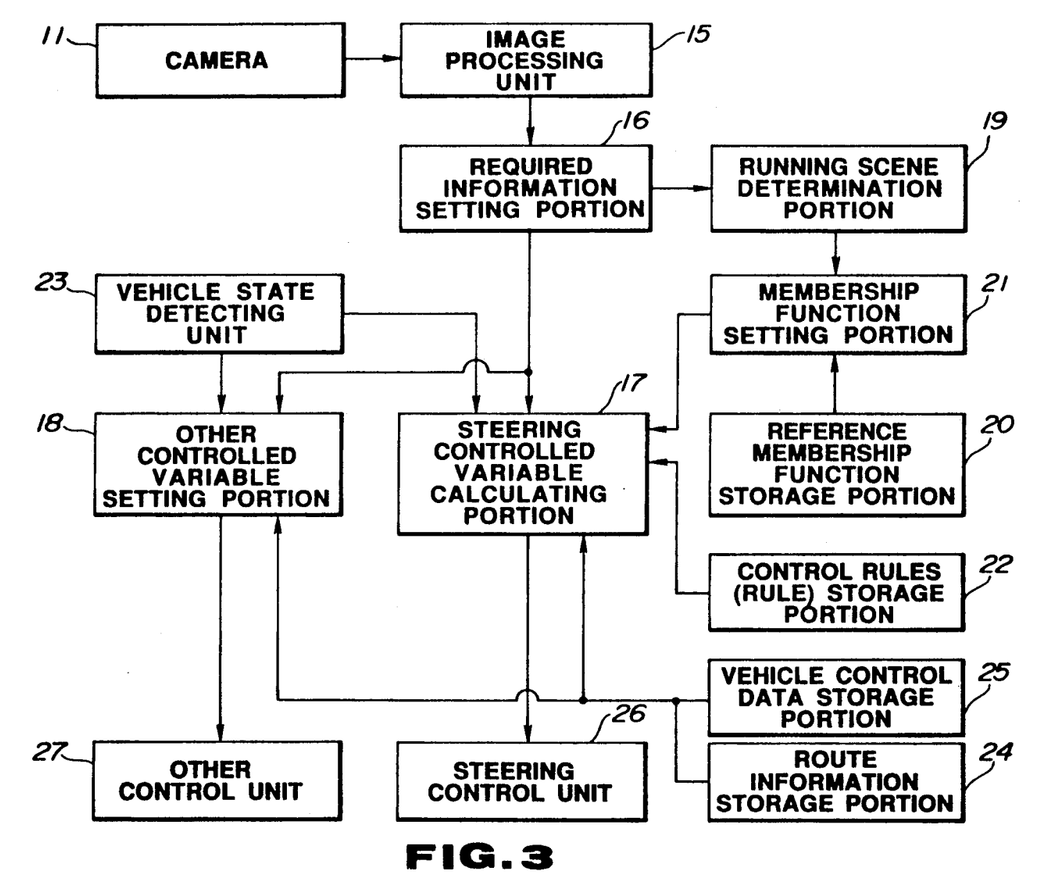
FIG. 3 is a functional block diagram of the autonomous vehicle shown in FIG. 1 in a preferred embodiment according to the present invention.

FIG. 3 shows a functional block diagram of the autonomous vehicle shown in FIG. 1.

As shown in FIG. 3, the autonomous vehicle includes an image processing unit 15 receiving a photograph, or image, signal derived from the above-described camera 11 and forming an image data, and a required information setting portion 16 selecting only a predetermined information such as the white lines 13 and an obstacle 14 from the formed image data of the image processing unit 15.

The required information setting portion 16 is connected to a steering control quantity calculation portion 17 as will be described later, to a control quantity setting portion 18 for controlling a clutch or brake, and to a running scene determination portion 19 especially installed on the autonomous vehicle in the preferred embodiment.

Figure 4:
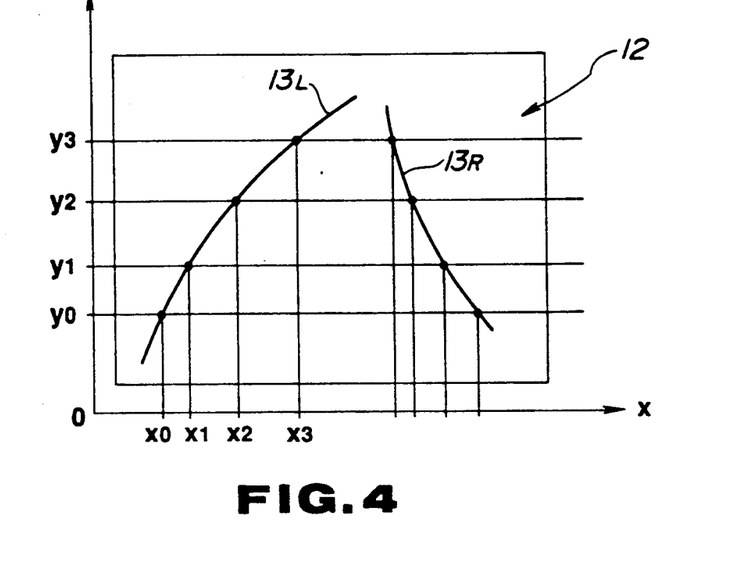
FIG. 4 is characteristic graphs indicating running roads for determining whether the vehicle runs on a straight road or curved road.
Figure 5:
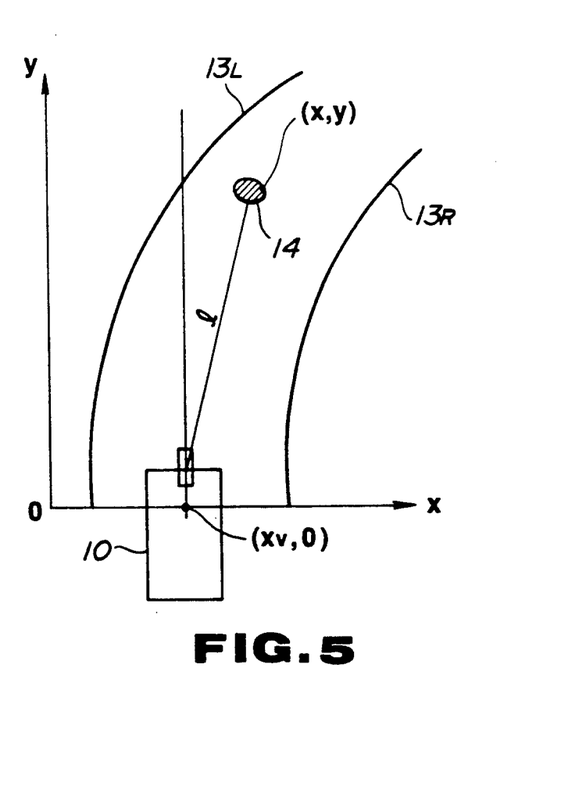
FIG. 5 is an explanatory view of determining whether the autonomous vehicle runs on an obstacle avoiding running.
Figure 6:
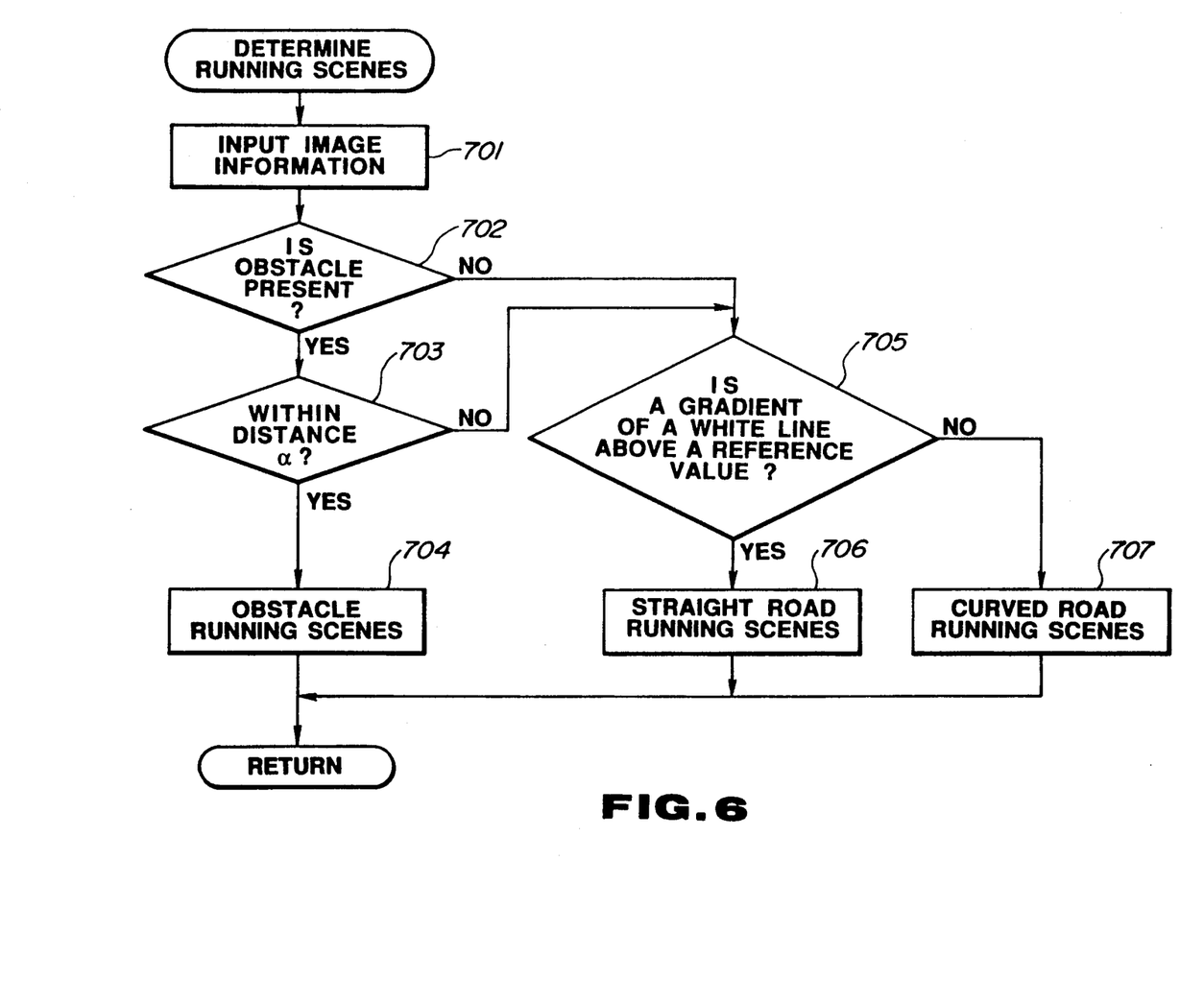
FIG. 6 is an operational flowchart for explaining a procedure of determining whether the autonomous vehicle runs on any one of running scenes.

The running scene determining, or classifying, portion 19 inputs the read information of the white lines $13_R$ and $13_L$ shown in FIGS. 4 and 5 set in the required information setting portion 16 and determines the running scene on the running road 12 in accordance with an operational flowchart shown in FIG. 6.

More specifically, an image information shown in FIGS. 4 and 5 is input to the running scene determining portion 19 at a step 701 of FIG. 6. In a step 703, the running scene determining portion 19 determines whether the obstacle 14 is present. In a step 703, the running scene determining portion 19 determines whether a distance x from the vehicle to the obstacle is shorter than a predetermined value $\alpha$ set according to the vehicle speed V. If Yes (shorter) in the step 703, the running scene determining portion 19 determines that it is a scene for the vehicle to take an avoidance action against the obstacle 14 in a step 704.

With the determination method described above and expressed in the mathematical formula, a forwarding direction of the vehicle coincides with a y axis of x, y coordinates shown in FIG. 5. Suppose that the vehicular position is expressed as (xv, o) and the position of the obstacle 14 is expressed as (x, y), where 12 can be expressed as $$(x-xv)^2+y^2=x^2$$

Therefore, the running scene of the running road 12 can be determined as $x<\alpha$.

On the other hand, in a case where the distance from the running vehicle to the obstacle 14 is considerably long ($x \geq a$) in a step 703, in a case where no avoidance action against the obstacle is yet required, or in a case where the running scene determining portion 19 determines that no obstacle 14 is present from the beginning in the step 702, the running scene determining portion 19 determines whether the white lines 13 are straight in a step 705.

The running scene determining portion 19 sets the straight road running scene or curved road running scene in steps 706 and 707.

When this determination, or classification, method is expressed in the mathematical formula, respective block lines are drawn on the x axis and y axis as shown in FIG. 4.

Suppose that the coordinates of the respective intersections are $(x_o, y_o)$, $(x_1, y_1)$, $(x_2, y_2)$, and $(x_3, y_3)$ and $i = 1, 2$, and 3, the function indicating the gradient of $f(i) = (y_i - y_o)/(x_i - x_o)$ is defined.

When $f(1) - f(3) \neq 0$ and $f(2) - f(3) \neq 0$, in other words, when all intersections are placed substantially on a straight line, the running road is determined to be the straight road.

The same determination method can be applied to the right white line $13_R$. The running scene determining portion 19 may alternatively determine the straight road when the spatial distances between a straight line and intermediate two points are respectively substantially zeros (0), the straight line connecting both end points from among four intersections $(x_o, y_o)$, $(x_1, y_1)$, $(x_2, y_2)$, and $(y_3, y_3)$ shown in FIG. 4.

As described above, the running scene determining portion 19 is used to determine whether the scene is the obstacle running scene, straight road running scene, and curved road running scene.

With reference to FIG. 3, to the running scene determination portion 19, the membership function setting portion 21 is connected together with a reference membership function storing portion 20. A steering controlled variable calculating portion 17 is connected to the membership function setting portion 21.

Figure 7:
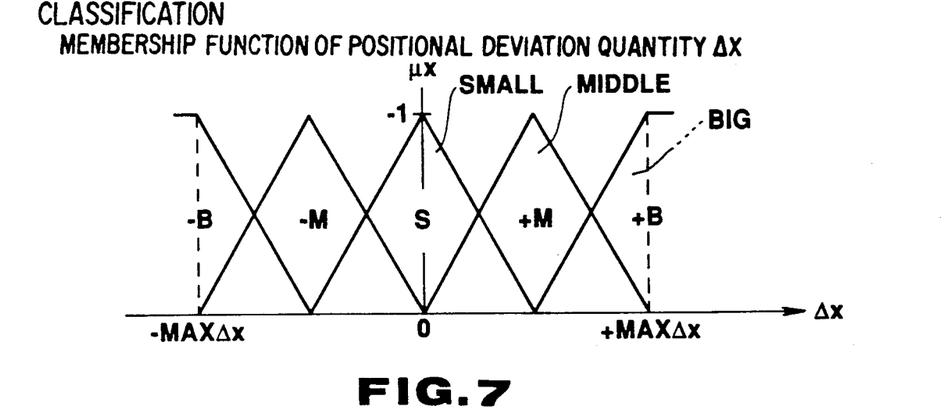
FIG. 7 is an explanatory view of a classification membership function of a positional deviation quantity $\Delta X$.
Figure 8:
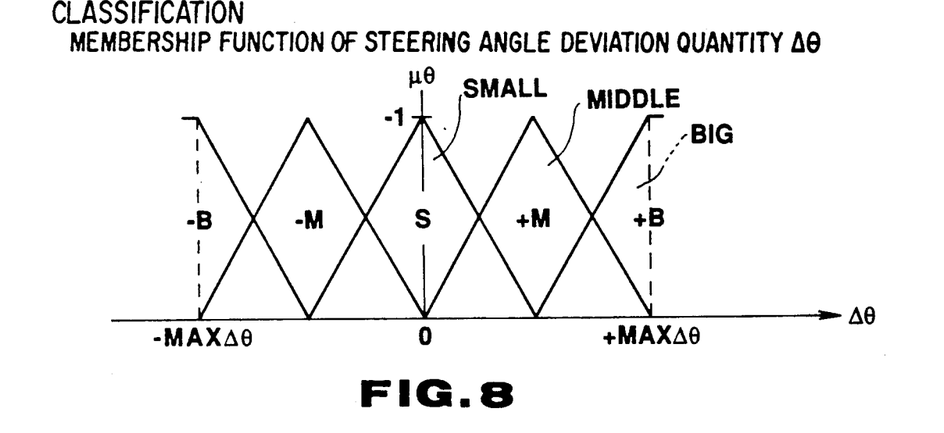
FIG. 8 is an explanatory view of a classification membership function of an angular deviation quantity $\Delta \theta$.

The reference membership function storing portion 20 stores the reference membership functions with respect to the deviation quantities $\Delta X$, $\Delta \theta$ concerning the position and angle shown in FIGS. 7 and 8.

More specifically, the membership function on the positional deviation quantity $\Delta X$ shown in FIG. 7 is expressed in such a way that five kinds of magnitude classifications "−B", "−M", "S", "+M", and "+B" of the deviation quantities $\Delta X$, wherein B denotes "large", M denotes "intermediate", and S denotes "small", are defined and certainties accomodating the respective classifications are expressed by membership values $\mu_x$ (0 through 1).

For maximum evaluation values $\pm \text{Max}\Delta X$ in both directions, maximum evaluation values, e.g., with respect to the straight running road scene are set as the reference values.

For the membership functions with respect to the deviation quantity $\Delta \theta$, with respect to the neutral steering angle are shown in FIG. 8.

The maximum values $\pm \text{Max}\Delta \theta$ in both directions are set as shown in FIG. 8.

It is noted that in FIG. 3 the portions 16 to 25 except the units 15, 26, and 27 and camera 11 are constituted by a microcomputer.

These membership functions represent certainties of respective classifications corresponding to the input deviation quantities $\Delta X$, $\Delta \theta$.

The membership function setting portion 21 sets the membership functions according to the running scenes by selecting the maximum evaluation values $\text{Max}\Delta X$ and $\text{Max}\Delta \theta$ from the predetermined values stored in the storage portion 20, the relative shape of the functions in the reference membership function storage portion 20 shown in FIGS. 7 and 8 remaining unchanged.

Figure 9:
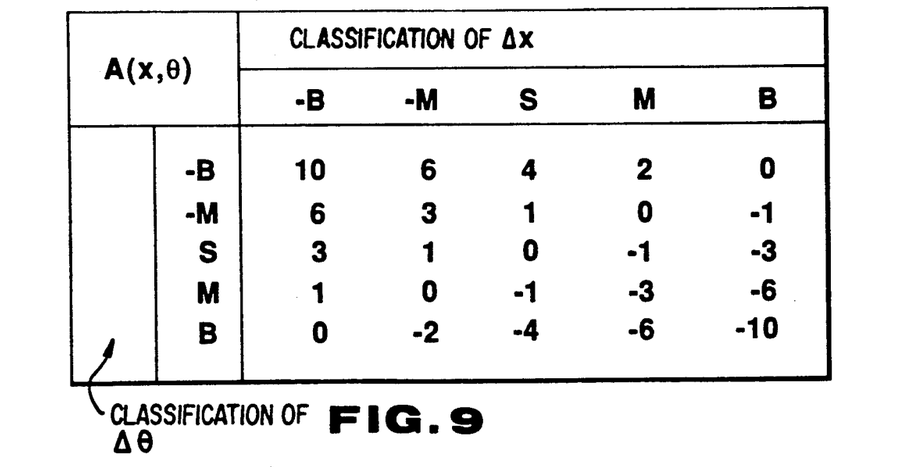
FIG. 9 is an explanatory view of the control rules with respect to deviation quantities X, $\theta$.

In more detail, the membership function setting portion 21 modifies the reference membership functions according to the running situations in such a way that the maximum evaluation values $\text{Max}\Delta X$, $\text{Max}\Delta \theta$ shown in FIGS. 8 and 9 are modified, e.g., to $\text{Max}\Delta X_1$, $\text{Max}\Delta \theta_1$ in the case of straight running scene, $\text{Max}\Delta X_2$, $\text{Max}\Delta \theta_2$ in the case of straight running scene, $\text{Max}\Delta X_3$, $\text{Max}\Delta \theta_3$ in the case of the obstacle avoiding running scene.

The steering controlled variable calculating portion 17 is connected to the control rule storing portion 22 in order to execute a fuzzy control.

The control rule storing portion 22 appropriately defines the controlled variable $A(X, \theta)$ in which the steering angle is to be changed according to the controlled variable, in this embodiment, the rule in the form of: if $\Delta x$ is $x$ and $\Delta \theta$ is $\theta$ then $\Delta S = A(x, \theta)$ according to 25 kinds of combinations of the deviation quantities $\Delta X$, $\Delta \theta$ concerning the position and angle, as shown in FIG. 9 and carries out a simulation operation in such a way that a specific steering angle displacement instruction S is set as $10°, 6°, --, -6°,$ and $\ldots 10°$.

The steering controlled variable calculating portion 17 includes a vehicle state detecting device 23 which detects various vehicle conditions such as vehicle speed or vehicle forwarding directions; a route information storage portion 24 which stores a route information having a map information such as an intermediate route to arrive at a target point, a vehicle control data storing portion 25 which temporarily stops the vehicle under a predetermined condition and instructs to provide a turn signal, and a steering control unit 26.

The other controlled variable setting portion 18 is connected to the required information setting portion 16, vehicle state detecting unit 23, route information storing portion 24, and vehicle control data storing portion 25 in order to set a predetermined controlled variable including an on-and-off information to an the other control unit 27 having a clutch, brake, turn signal, and alarm unit.

In the structure of the autonomous vehicle described above, the other controlled variable setting portion 18 sets a predetermined controlled variable to the other control unit 27 on the basis of the condition data output from the route information storing portion 24 and from the vehicle control data storing portion 25, with such states as the vehicle speed and forwarding direction $\theta$ output from the vehicle state detecting unit 23, e.g., producing a right turn signal in front of a right turn intersection and applying a brake in front of the target point taken into consideration.

On the other hand, the steering controlled variable calculating portion 17 calculates the controlled variable of the steering angle using the fuzzy control method described below, adds a condition forcefully instructed by means of the route information storing portion 24 and vehicle control data storing portion 25 to set a predetermined controlled variable to the steering control unit 26.

Figure 10:
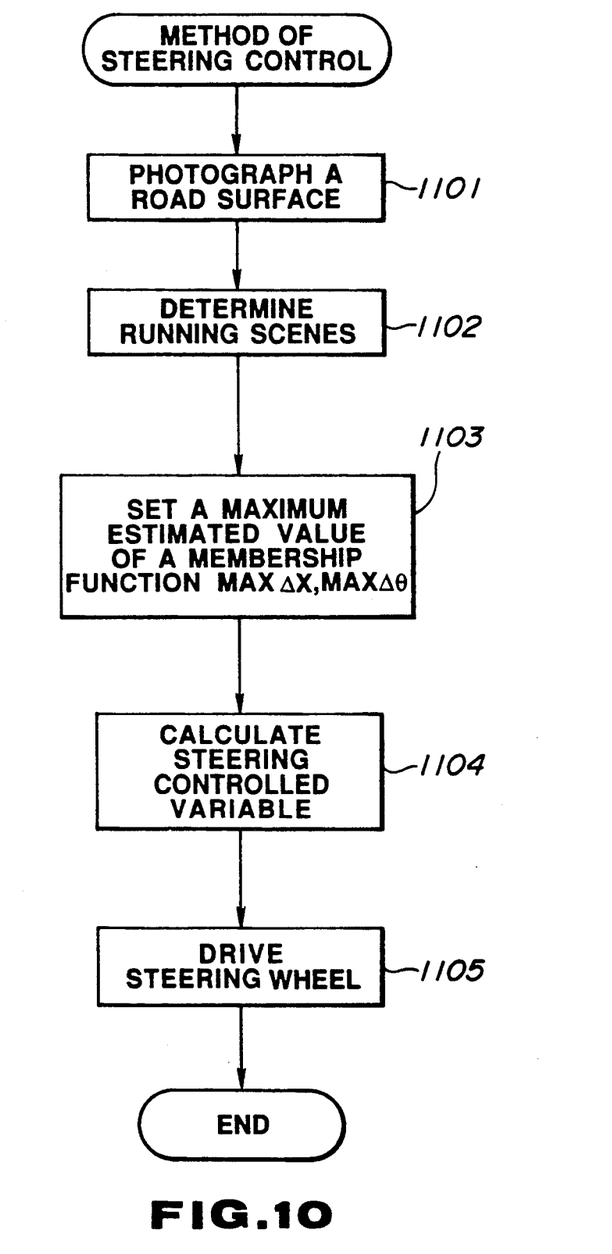
FIG. 10 is an operational flowchart indicating a steering control method executed in the preferred embodiment.

FIG. 10 shows an operational flowchart indicating a steering control method executed by the steering controlled variable calculating portion 17.

In the preferred embodiment, a road surface 12 is photographed by means of the camera 11 shown in FIG. 1 in a step 1101. In a step 1102, the running scene is determined by means of the running scene determining portion 18 shown in FIG. 3. The maximum evaluation values Max$\Delta X$, Max$\Delta \theta$ of both membership functions as shown in FIGS. 7 and 8 are set according to any one of the present running scenes in a step 1103.

The steering controlled variable using a fuzzy inference is calculated as will be described below in a step 1104. In a step 1105, the steering of the autonomous vehicle 10 is controlled.

Figure 11:
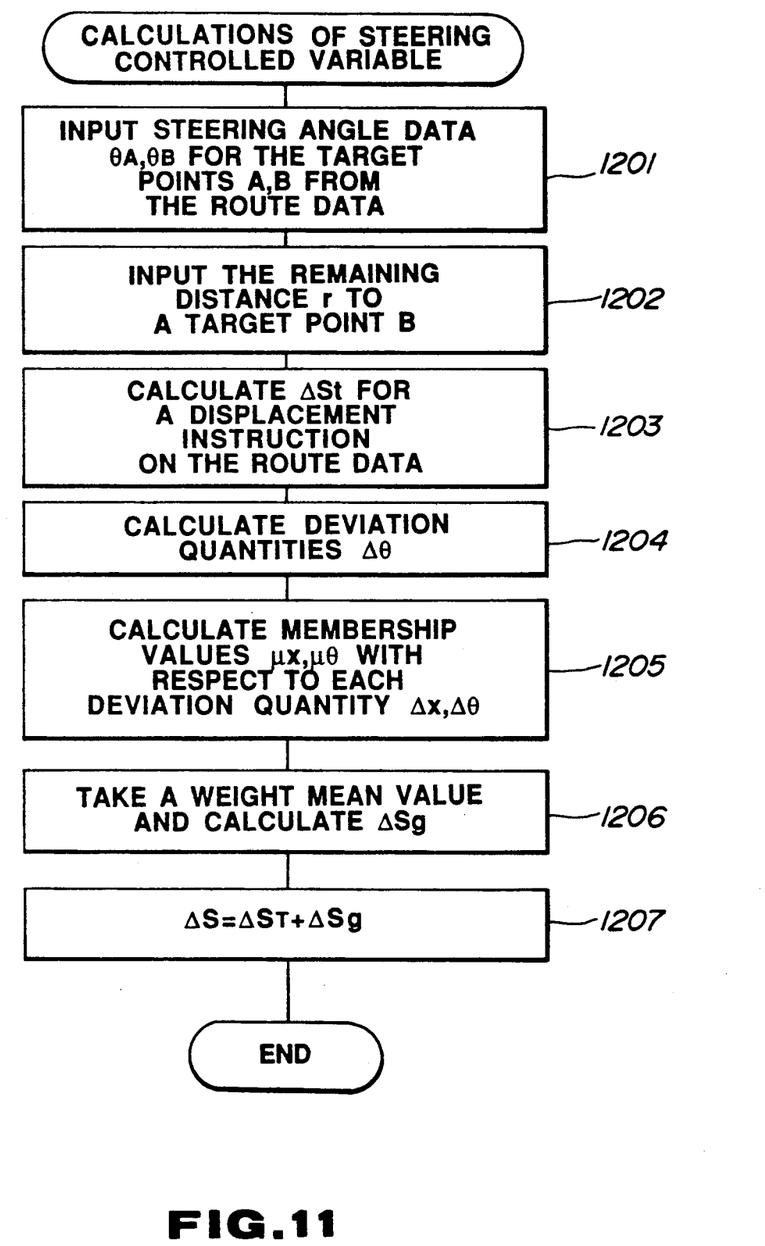
FIG. 11 is an operational flowchart of a calculating procedure on a steering control quantity.

FIG. 11 shows an operational flowchart indicating a calculation procedure of the steering controlled variable executed in the step 1104 shown in FIG. 10.

Figure 12:
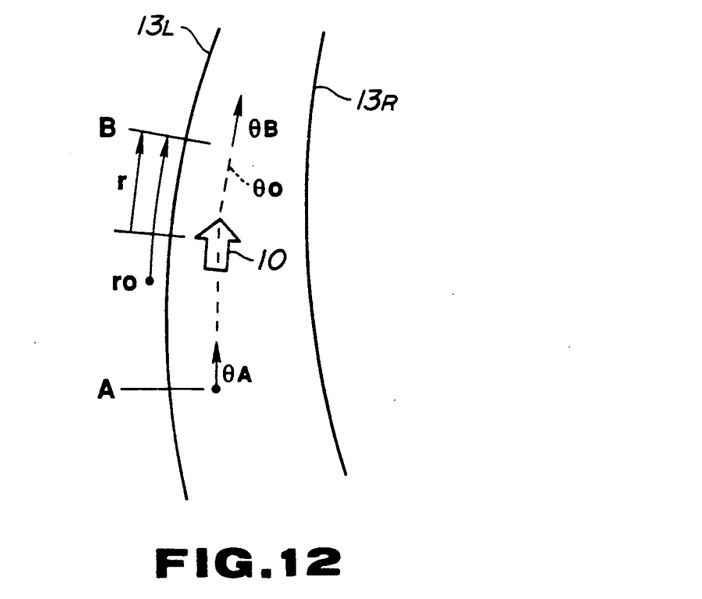
FIG. 12 is an explanatory view of a method of calculating the steering control quantities on the basis of route data.

In the step 1201, steering angle data $\theta_A$, $\theta_B$ at the target points A and B corresponding to a start point and end point of the present passage interval in the route of travel and previously set as shown in FIG. 12 are input via a register from the route data stored in the route information storing portion 24.

The steering data $\theta_A$, $\theta_B$ indicate a posture of the vehicle to be taken at the respective target points A and B. In other words, the vehicle arriving from the prior target point (not shown) to the first target point A has the forward direction $\theta_A$ and, next, at the target point B at which the vehicle arrives the vehicle should have the steering angle data of $\theta_B$.

In a step 1202, the remaining distance r to the subsequent target point B is input from the vehicle state detecting unit 23. In a step 1203, the steering angle displacement instruction $\Delta S_T$ on the route data is calculated using the following equation:

$$\Delta S_T = drf \cdot \theta_A + (1 - drf) \cdot \theta_B - \theta$$

, wherein $\theta$ denotes a present steering angle, drf denotes a function value which defines so that the value of drf approaches from 1 to zero (0) as the remaining distance r becomes reduced when the remaining distance r indicates [1] until it approaches a constant distance $r_o$ (for example, 5 m) to the target point B. The function value drf is exemplified by a Japanese Utility Model Registration Application First Publication No. Heisei 1-155510 as df.

ti $drf = \min \{1, r/r_o\}$

That is, the displacement instruction $\Delta S_T$ denotes an offset (deviation) quantity with respect to a target steering angle $\theta_o$ shown by a broken line of FIG. 12 which specifies the steering angle to gradually change at a location followed by the target point so that the target steering angle $\theta_A$ at the target point A and indicates the target steering angle $\theta_B$ at the target point B. The displacement instruction $\Delta S_T$ of the steering angle derived in this way is said to be a basic quantity of the steering.

Figure 13:
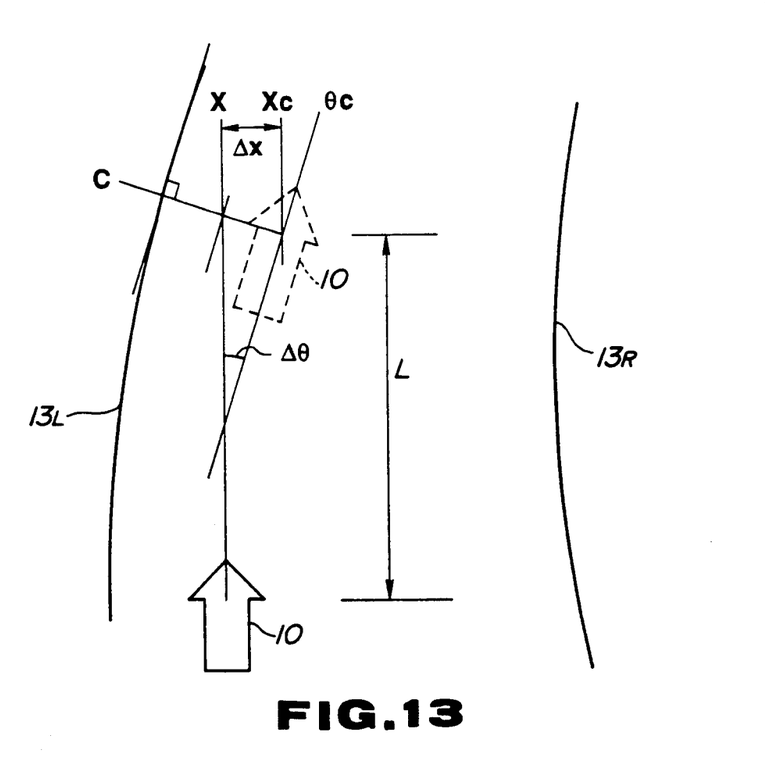
FIG. 13 is an explanatory view of a method of calculating a steering angle displacement instruction on a basis of a route data.

Next, in a step 1204, an intermediate target point C is automatically set at a location in front of the present vehicle by a distance $L_m$ set according to the vehicle speed V shown in a solid line of FIG. 13, as denoted by a broken line of FIG. 13. The deviation quantity $\Delta X$ in the lateral direction of the vehicle 10 and steering angle deviation quantity $\Delta \theta$ are calculated with respect to the target steering angle $\theta_c$.

$$L = L_o + 0.25V$$

$$\Delta X = X_c - X$$

$$\Delta \theta = \theta_c - \theta$$

Provided that $L_o$ denotes a constant distance, $X_c$ denotes a predicted position of the vehicle at the target point C in a case where the steering angle remains unchanged.

Next, in a step 1205, the membership function shown in FIGS. 7 and 8 in which the maximum evaluation value is set according to the running scene in a step 1103 of FIG. 10 with respect to each deviation quantity $\Delta X$, $\Delta \theta$. The membership values of $\mu_x$, $\mu_\theta$ are derived which indicates certainties corresponding to the respective classifications "−B", "−M", "S", "+M", and "+B".

Figure 14:
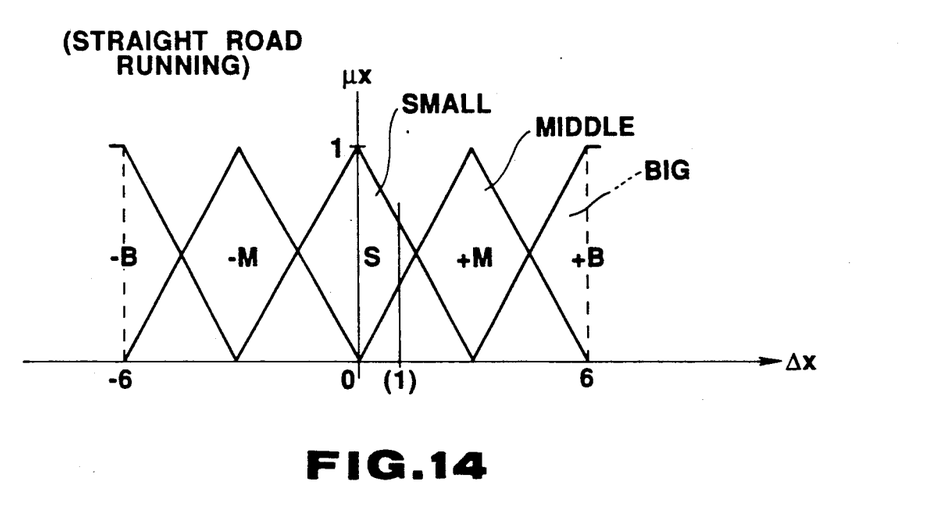
FIGS. 14 and 15 are explanatory views of a method for constricting and changing the reference membership function.

For example, since in a case where the running scene is the straight road, the maximum evaluation value Max$\Delta X$ of the membership function as shown in FIG. 14 is set as, e.g., 6 m, the positional deviation quantity X is 1 m. In this case, the membership value indicates 0.7 which corresponds to the classification "S" and the membership value corresponding to the classification "+M" indicates 0.3. The other classifications are all zero (0). For the angular deviation quantity $\Delta \theta$, the membership value $\mu \theta$ is set in the same way.

Next, in a step 1206, 25 control rules shown in FIG. 10 are used. The calculated membership values are given to calculate a weight average. Thus, the steering displacement instruction $\Delta S_g$ of the fuzzy control is calculated.

The control rules shown in FIG. 9, i.e., are expressed in the following way:

if $\Delta X$ is $X$ and $\Delta \theta$ is $\theta$ then $\Delta S = A(X, \theta)$.

The weight average is taken for all rules from the following equation so that the steering angle displacement instruction $\Delta S_g$ for all fuzzy controls can be obtained.

$$\Delta S_g = \left[ \sum_\theta \sum_X \{\min(\mu_x, \mu\theta) \cdot A(x, \theta)\} \right] / \left[ \sum_\theta \sum_X \min(\mu_x, \mu\theta) \right]$$

That is, the weight mean in the preferred embodiment is to take the weight mean of these totals by multiplying the membership values whose deviation quantities are smaller than the displacement instruction A (X, $\theta$) set for each control rule.

It is noted that a weight is placed on the smaller deviation quantity in order to avoid an abrupt steering operation caused by a maximal value and enable a more stable running of the vehicle 10.

In a step 1207, a sum of the steering displacement instructions $\Delta S_T$ and $\Delta S_g$ obtained in steps 1203 and 1206 is derived as follows:
ti $\Delta S = \Delta S_T + \Delta S_g$ The displacement instruction $\Delta S$ calculated in this way is output to the steering control unit 26 shown in FIG. 3 so that the displacement $\Delta S$ is given to the present steering angle $\theta$.

Hence, the vehicle 10 runs autonomously along, e.g., the left white line $13_L$ in accordance with the route data previously set as shown in FIG. 12. When the vehicle 10 runs out of the intermediate specified route or takes a different posture as specified, it is possible to appropriately control the steering by means of the displacement instruction $\Delta S_T$ calculated in the step 1203 in FIG. 11.

At the same time, the camera 11 is used to photograph the road surface 12 in the preferred embodiment. As shown in FIG. 13, the intermediate target point C is automatically set in front of the present distance by the distance $L_m$ and the fuzzy control gives the displacement instruction $\Delta S_g$ to the target values $X_c$, $\theta_c$ defined at the target point C.

Figure 15:
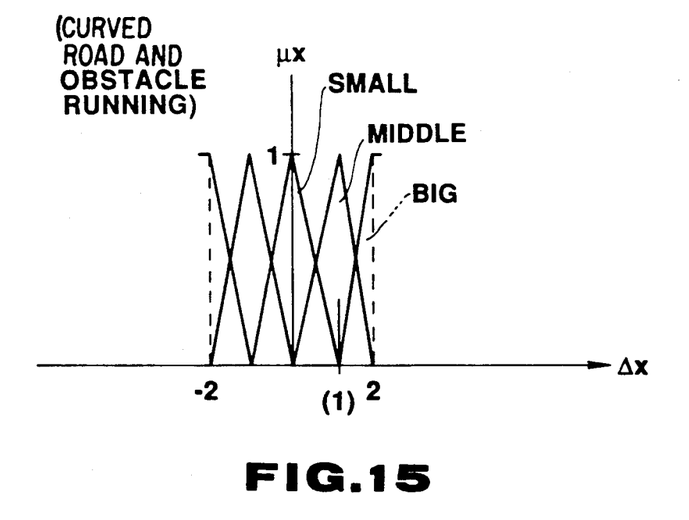

It is noted that since the maximum evaluation values Max$\Delta X$, Max$\Delta\theta$ of the reference membership function are changed in a step 1103 of FIG. 10, they are constricted as shown in FIG. 15 in the case of the curved road run with the straight road run of FIG. 14 as the reference. In addition, it is possible to sensitively respond to the small deviation quantities $\Delta X$, $\Delta\theta$. Specifically, if the deviation quantity is 1 m, e.g., as in the curved road, it can be determined to be "intermediate" so that an appropriate fuzzy control can be made.

In addition, in the obstacle avoidance running shown in FIG. 5, smaller values may be set to the maximum values Max$\Delta X$, Max$\Delta\theta$ in order to ensure the avoidance of the obstacle 14.

Furthermore, even if the vehicle runs on the straight road, on the curved road, and around the obstacle, other maximum evaluation values are set according to degrees of such road situations (,e.g., radius of curvature) so that a more sensitive or more insensitive response can be achieved.

Since, in the preferred embodiment described above, the running scene can automatically be determined and the maximum evaluation values for the membership functions can be modified according to the running scenes, various kinds of running scenes may be responded using the same control rules. In addition, a more accurate and more precise definition may be carried out only to the reference membership functions and their setting operations may especially be facilitated.

Figure 16:
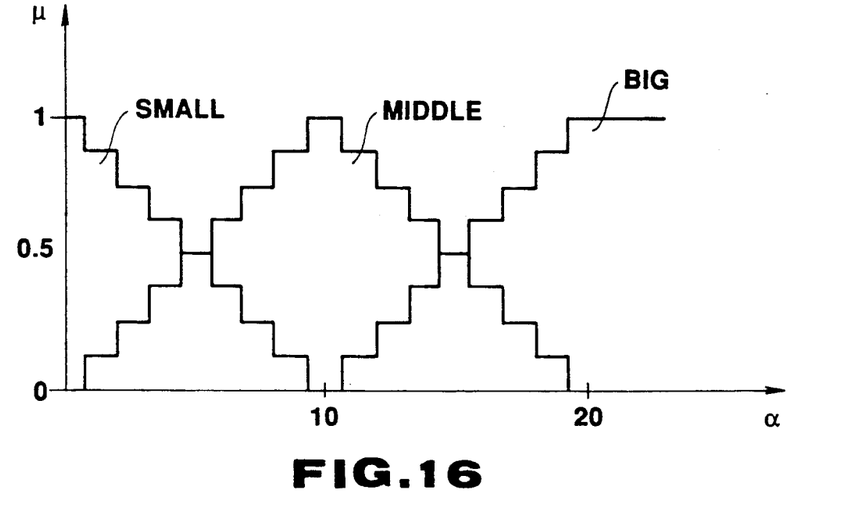
FIGS. 16 and 17 are explanatory views of a method for constructing and changing the membership function expressed as a discrete data.
Figure 17:
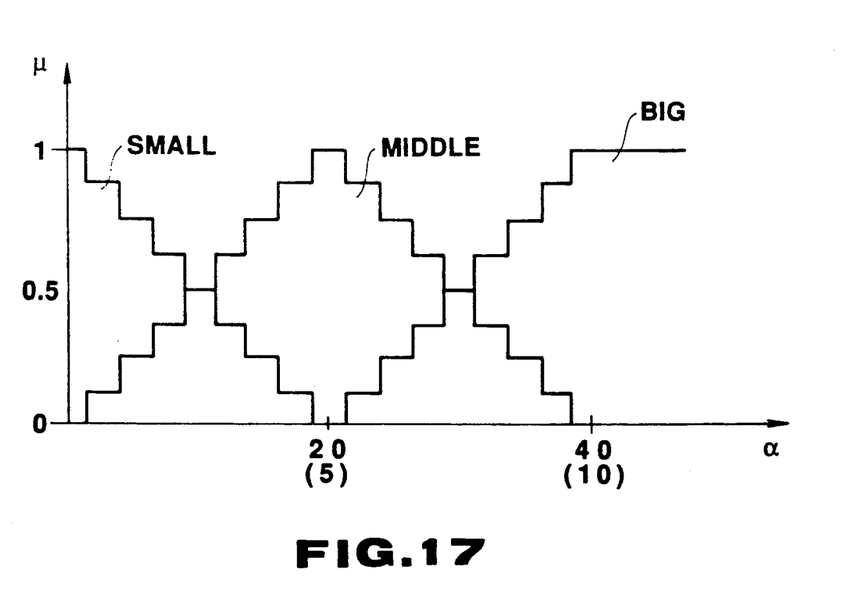

FIGS. 16 and 17 show other application examples of the membership functions.

That is, in the examples shown in FIGS. 16 and 17, the membership functions are expressed in the discrete data as shown in FIG. 16. As shown in FIG. 17, their maximum evaluation values $\alpha$ (Max$\Delta X$, Max$\Delta\theta$) are largely (or slightly) modified according to their running scenes.

Since, in the examples shown in FIGS. 16 and 17, the discrete data of the membership values $\mu$ are searched according to the deviation quantity $\alpha$ ($\Delta X$, $\Delta\theta$), the structure of data can be facilitated.

The calculating speed can be increased since a rate of reduced scale K is generated on the deviation quantity $\alpha$ to provide $\alpha \times K$ even through the modification of the reduced scale according to the running scenes.

Although in the example shown in FIGS. 16 and 17 the modification of the membership function is carried out by the change in the maximum evaluation values, the change in angles of the triangular functions for each classification or change from the triangular functions to sinusoidal functions may alternatively be carried out.

As described hereinabove, since in the autonomous vehicle according to the present invention the setting operations of the control rules and setting operations of the membership functions can be facilitated so that the appropriate fuzzy control may be carried out according to the various running scenes including the straight road, curved road, or obstacle and a stable running control can be carried out.

It will fully be appreciated by those skilled in the art that the foregoing description has been made in terms of the preferred embodiment and various changes and modifications may be made without departing from the scope of the present invention which is to be defined by the appended claims.

What is claimed is:

1. An autonomous vehicle, comprising:
   a) first means for imaging a road surface on which the vehicle runs, having an image plane and an associated image data generating means;
   b) second means for detecting a plurality of predetermined features contained within the data output by the first means and generating characterizing point data corresponding to said plurality of predetermined features;
   c) third means for classifying the image data output by said first means as a running scene among a group of predetermined running scenes on the basis of the characterizing point data generated by the second means;
   d) fourth means for selecting at least one among a group of predetermined reference membership functions according to the classification of the running scene, said membership function indicating a certainty of correspondence between a measured steering deviation quantity and a member of a group of predetermined deviation magnitudes, said measured steering deviation quantity being a difference between a measured vehicle steering angle and a predetermined vehicle steering angle;
   e) fifth means for measuring a steering angle of the vehicle;
   f) sixth means for selecting, based on a reference membership function selected by said fourth means and a measured steering deviation quantity operated on by said selected function, at least one among a group of predetermined control rules;
   g) seventh means for calculating a steering controlled variable of the vehicle on the basis of the measured steering angle of the vehicle, characterizing point data generated by the second means, the membership function selected by the fourth means, and a control rule selected by the sixth means; and
   h) eighth means for controlling an operation of a mechanism controlling the steering angle of the vehicle according to the calculated steering controlled variable.

2. An autonomous vehicle as set forth in claim 1, wherein the predetermined features include guide lines along the road surface and an obstacle present on the road surface.

3. An autonomous vehicle as set forth in claim 2, wherein said predetermined group of running scenes includes an obstacle running scene and the third means has means for determining, based on characterizing point data generated by the second means, whether an obstacle is present on the road surface corresponding to the image data from the first means, whether a distance (l) from the vehicle to the obstacle is shorter than a predetermined distance ($\alpha$), and based on said obstacle determination and said distance determination, indicates if the image output by said first means is the obstacle running scene.

4. An autonomous vehicle as set forth in claim 3, wherein the third means calculates the distance (l) using the following equation:

$$(x-xv)^2 + y^2 = l^2$$

, wherein y is a distance along first axis parallel to a forwarding direction of the vehicle, x is a distance from a reference point to the obstacle along a second axis perpendicular to the first axis of y, and xv is a distance along said second axis from said reference point to a point on the vehicle.

5. An autonomous vehicle as set forth in claim 4, wherein said predetermined group of running scenes includes a straight running road scene and a curved running road scene and the third means has means for determining, based on one or both of the determined distance being equal or greater than the predetermined distance and no obstacle being determined within the image, whether said guide lines are substantially straight and, based on said determination, indicates whether the image output by the first means is the straight running road scene or the curved road running scene.

6. An autonomous vehicle as set forth in claim 5, wherein the second means outputs a group of points including $(x_0, y_0)$, $(x_1, y_1)$, $(x_2, y_2)$, and $(x_3, y_3)$, corresponding to an image on said image plane of a left guide line along the road surface and the third means determines whether the vehicle is running on a straight road based on a gradient function defined as $f(i) = -(y_i - y_0)/(x_i, x_0)$ where i—1, 2, and 3, and based on $f(1)-f(3)$ and $f(2)-f(3)$.

7. An autonomous vehicle as set forth in claim 6, which further comprises ninth means for storing the reference membership function with respect to deviation quantities $\Delta X$, $\Delta \theta$ on a position of the vehicle and angle of the vehicle with respect to the running road.

8. An autonomous vehicle as set forth in claim 7, wherein the membership function on the positional deviation quantity is such that five kinds of magnitude classification deviation quantities X: "−B", "−M", "S", "+M", and "+B" are defined, with B being large, M being intermediate, and S being small, and a membership value $\mu_x$ (0 to 1) indicates a certainty accomodating each classification.

9. An autonomous vehicle as set forth in claim 8, wherein maximum evaluation values at the straight road running scene are set as reference values for maximum evaluation values $\pm$Max$\Delta X$ in both directions.

10. An autonomous vehicle as set forth in claim 9, wherein the membership function on the angle quantity is such that five kinds of magnitude classification deviation quantities $\theta$: "−B", "−M", "S", "+M", and "+B" are defined and maximum evaluation values $\pm$Max$\Delta \theta$ are set.

11. An autonomous vehicle as set forth in claim 10, wherein the membership functions represent the certainties of accommodations for the respective classifications at intersections of respective triangular shaped functions corresponding to input deviation quantities $\Delta X, \Delta \Theta$.

12. An autonomous vehicle as set forth in claim 11, wherein the fourth means selects the membership function according to the identified running scene, and changes the maximum evaluation values Max$\Delta X$, Max$\Delta \Theta$ using a predetermined shape of the reference membership function.

13. An autonomous vehicle as set forth in claim 12, wherein the fourth means changes the maximum evaluation values Max$\Delta X_1$, Max$\Delta \Theta_1$ when the third means identifies a straight running road scene, Max$\Delta X_2$, Max$\Delta \Theta_2$ when the third means identifies a curved running road scene, Max$\Delta X_3$, Max$\Delta \Theta_3$ when the third means identifies a obstacle running road scene.

14. An autonomous vehicle as set forth in claim 13, wherein the control rule is selected by the sixth means according to 25 kinds of combinations of the deviation quantities $\Delta X$, $\Delta \Theta$ on the position and angle based on a rule in the form of "if $\Delta X$ is X and $\Delta \Theta$ is $\Theta$ then $\Delta S = A (X, \Theta)$".

15. An autonomous vehicle as set forth in claim 14, wherein the seventh means calculates a displacement instruction $\Delta S_T$ of the steering angle on a route data using the following equation:

$$\Delta S_T = drf \Theta_A + (1 - drf) \Theta_B - \Theta,$$

wherein $\Theta$ denotes the measured steering angle, drf denotes a function value defined such that 1 is indicated when a remaining distance r to a target point B is a constant distance $r_0$ and varies from 1 to 0 as the remaining distance r becomes smaller than the constant distance $r_0$ (where $drf = \min\{1, r/r_0\}$).

16. An autonomous vehicle as set forth in claim 15, wherein the seventh means automatically sets an intermediate target point C from the vehicle speed to a predetermined distance $L_m$ set according to a vehicle speed with respect to the measured steering angle of the vehicle and calculates a lateral direction deviation quantity $\Delta X$ and a deviation quantity $\Delta \Theta$ of the steering angle with respect to a target position $X_c$ and target posture $\Theta_c$ at the target point C using the following equation:

$$L = L_0 + 0.25V$$

$$\Delta X = X_C - X$$

$$\Delta \Theta = \Theta_c - \Theta$$

, wherein $L_0$ denotes a constant distance, X denotes a predicted position at the target point C based on the current measured steering angle.

17. An autonomous vehicle as set forth in claim 16, wherein the seventh means derives the membership values $\mu_x$, $\mu_\theta$ of certainties corresponding to each classification "−B", "−M", "S", "+M" and "+B" with respect to each deviation quantity $\Delta X$, $\Delta \theta$.

18. An autonomous vehicle as set forth in claim 17, wherein the seventh means calculates a weight average of the control rules selected by the sixth means based on a membership value indicated by a membership function selected by said fourth means and for the displacement instruction $\Delta S_E$ for the fuzzy control $S_g$.

19. An autonomous vehicle as set forth in claim 18, wherein the seventh means derives a sum of the displacement instructions $\Delta S_T$ and $\Delta S_g$: $\Delta S_T + \Delta S_g$.

20. An autonomous vehicle as set forth in claim 19, wherein the eight means derives the steering control of the vehicle so that the displacement $\Delta S$ is given to a present steering angle $\Theta$.

21. An autonomous vehicle as set forth in claim 10, wherein the membership functions are expressed in discrete data and the discrete data of the membership values $\mu$ are searched according to the deviation quantities $\alpha$ ($\Delta X$, $\Delta\theta$).

22. An method for autonomously operating a vehicle, comprising the steps of:
- a) imaging a road surface on which the vehicle runs, and generating an associated image data;
- b) detecting a plurality of predetermined features contained within the image data output by step a) and generating characterizing point data corresponding to said plurality of predetermined features;
- c) classifying the image data output by said step a) as a running scene among a group of predetermined running scenes on the basis of the characterizing point data generated by step b);
- d) selecting at least one among a group of predetermined reference membership functions according to the classification of the running scene, said membership function indicating a certainty of correspondence between a measured steering deviation quantity and a member of a group of predetermined deviation magnitudes, said measured steering deviation quantity being a difference between a measured vehicle steering angle and a predetermined vehicle steering angle;
- e) measuring a steering angle of the vehicle;
- f) selecting, based on a reference membership function selected by step d) and a measured steering deviation quantity operated on by said selected reference membership function, at least one among a group of predetermined control rules;
- g) calculating a steering controlled variable of the vehicle on the basis of the measured steering angle of the vehicle, characterizing point data generated by step b), the membership function selected by step d), and a control rule selected by step f); and
- h) controlling an operation of a mechanism controlling the steering angle of the vehicle according to the calculated steering controlled variable.

* * * * *